Figure 1:
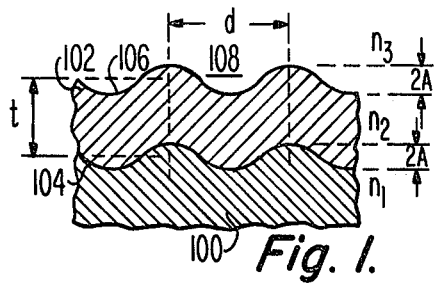

United States Patent [19]

Knop

[11] 4,426,130
[45] Jan. 17, 1984

[54] SEMI-THICK TRANSMISSIVE AND REFLECTIVE SINUSOIDAL PHASE GRATING STRUCTURES

[75] Inventor: Karl H. Knop, Zurich, Switzerland
[73] Assignee: RCA Corporation, New York, N.Y.
[21] Appl. No.: 235,972
[22] Filed: Feb. 19, 1981
[51] Int. Cl.³ .............................................. G02B 5/18
[52] U.S. Cl. ................................................ 350/162.2
[58] Field of Search ...................... 350/162.11, 162.17, 350/162.20, 162.21, 162.23

[56]  References Cited
U.S. PATENT DOCUMENTS
3,293,331 12/1966 Doherty .......................... 350/162.17

Primary Examiner—Bruce Y. Arnold
Assistant Examiner—William Propp
Attorney, Agent, or Firm—J. S. Tripoli; G. J. Seligsohn

[57] ABSTRACT

Markedly increased optical efficiency for a first diffraction order of incident wave energy, such as light, is derived from a layer of transparent material having effectively two serially spaced sinusoidal phase gratings of the same line spacing, each formed as a surface relief pattern thereon, by prescribing the thickness of the layer, the amplitude of the gratings, the respective indices-of-refraction of the layers and of transparent materials bounding the phase grating surfaces thereof, and the angle of incidence of the wave energy.

22 Claims, 8 Drawing Figures

SEMI-THICK TRANSMISSIVE AND REFLECTIVE SINUSOIDAL PHASE GRATING STRUCTURES

This invention relates to sinusoidal phase grating structures and, more particularly, to both transmissive and reflective sinusoidal phase gratings having a novel structure which increases the percentage of incident light diffracted into a first diffraction order.

Theoretically, the maximum percentage of incident light that can be diffracted into the first diffraction order by a thin, relatively coarse (i.e., having a large ratio of line spacing to the wavelength of the incident light) sinusoidal phase grating structure is 34%. There are cases in which the useful output light from a device comprised of a sinusoidal phase grating structure is the first diffraction order light. In such cases, an increase in the optical efficiency of the device can be achieved by the raising the relative amount of incident light in the first diffraction order beyond this theoretical maximum limit for a coarse grating of 34%. One way of accomplishing this increase in optical efficiency is disclosed in my U.S. Pat. No. 3,961,836, which issued June 8, 1976. Briefly, in accordance with the teachings of this patent, experiments have shown that an optical read-out efficiency of the first diffraction order approaching 50% can be achieved from a thin, fine-line sinusoidal phase grating structure (in which the ratio of the line spacing to the wavelength of the incident light is greater than one but less than 2) if the incident light beam is inclined at an angle greater than 30° with respect to the normal to the plane of the grating. In this patent, the device was a focused-image hologram recorded in a thin phase medium.

The present invention is directed to a "semi-thick" sinusoidal phase grating structure. More specifically, such a "semi-thick" sinusoidal phase grating structure is comprised of a substrate covered by at least one layer of material of a specified thickness which is transparent to incident wave energy (such as light) including a given wavelength. The layer of transparent materail exhibits a first given index-of-refraction. The layer includes two effective sinusoidal phase gratings having the same given line spacing, a first of which effective gratings is formed by a relief pattern on a surface of the layer that bounds a medium from which the incident wave energy enters the layer and a second of which effective gratings is formed by a relief pattern on a surface of the layer that bounds a medium from which the entered wave energy traveling within the layer exits the layer. The first and second effective gratings have first and second physical amplitudes and the entering and exiting medium exhibit respectively second and third given indices-of-refraction. In a transmissive structure, the first and second effective phase gratings are formed by separate relief patterns situated respectively on the top and bottom surfaces of the layer. However, in a reflective structure, the layer is backed by a mirror and the entering and exiting mediums are the same. Therefore, in this case, the first and second effective phase gratings are formed by the same single relief pattern situated on the surface of the layer in contact with this medium. The optical efficiency of such a "semi-thick" phase grating structure, in deriving a first diffraction order output, can be markedly increased by properly selecting, in accordance with the principles of the present invention, the respective values of the specified thickness of the layer, the line spacing and respective physical amplitudes of the effective phase gratings, and the first, second and third given indices-of-refraction, as well as the angle of incidence of the wave energy. Specifically, it is possible to increase the theoretical maximum optical efficiency for coarse "semi-thick" phase grating structures, to 68%. In principle, a multiplicity of two or more such "semi-thick" layers situated in stacked relationship could be used to further increase the theoretical maximum optical efficiency of a coarse "semi-thick" sinusoidal phase structure above 68%. However, the fabrication of such a multiple-layer structure is too difficult to be practical at present. On the other hand, the principles of the present invention can be combined with the teachings of my aforesaid U.S. Pat. No. 3,961,836 to provide a fine-line sinusoidal phase grating structure, employing only a single "semi-thick" layer, to provide a first-order optical efficiency of up to at least 80%.

Figure 2:
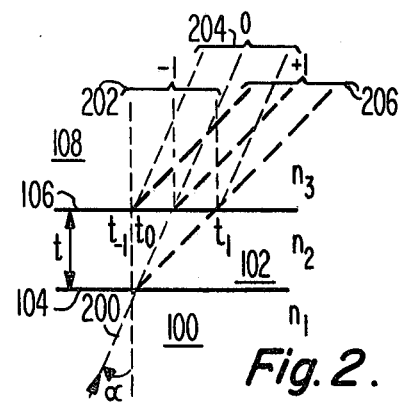
Figure 3:
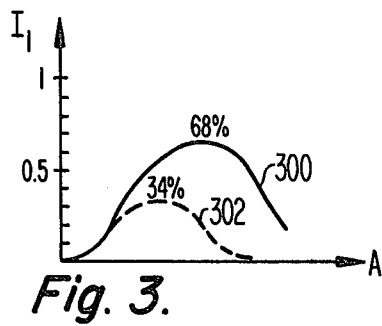
Figure 4:
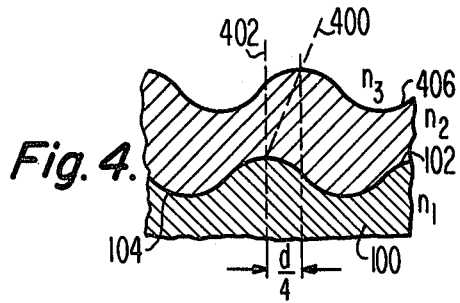
Figure 5:
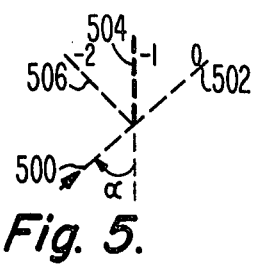
Figure 6:
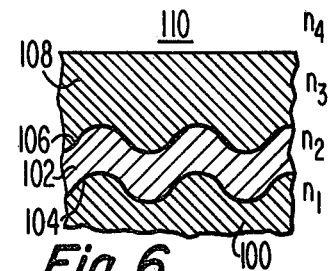
Figure 7:
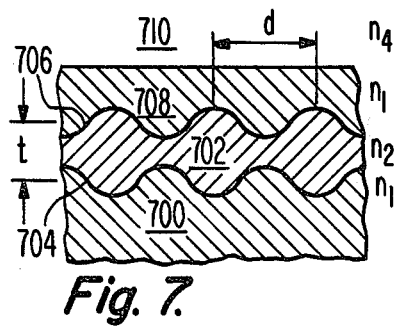
Figure 8:
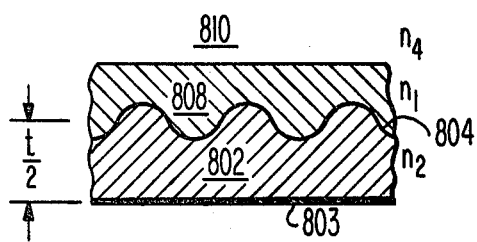

In the drawings:

FIG. 1 schematically illustrates a transmissive phase grating structure incorporating a first embodiment of the present invention;

FIG. 2 diagrammatically illustrates the diffraction properties of the phase grating structure shown in FIG. 1;

FIG. 3 is a graph illustrating the relative optical efficiency of a coarse "semi-thick" sinusoidal phase grating structure with respect to that of a coarse thin phase grating;

FIG. 4 schematically illustrates a transmissive phase grating structure incorporating a second embodiment of the present invention;

FIG. 5 diagrammatically illustrates the diffractive properties of the phase grating structure shown in FIG. 4;

FIG. 6 schematically illustrates a transmissive phase grating structure incorporating a third embodiment of the present invention;

FIG. 7 schematically illustrates a transmissive phase grating incorporating a fourth embodiment of the present invention; and FIG. 8 schematically illustrates a reflective phase grating structure incorporating a fifth embodiment of the present invention.

Referring to FIG. 1, there is schematically shown a substrate 100 composed of a transparent material exhibiting an index-of-refraction $n_1$. Substrate 100 is covered by a layer 102 composed of another transparent material exhibiting an index-of-refraction $n_2$. Layer 102 has a thickness t. The boundary 104 between the upper surface of substrate 100 and the lower surface of layer 102 is in the form of a sinusoidal relief pattern having a spatial line spacing periodicity of d and a peak-to-peak amplitude of 2A. The boundary 106 between the upper surface of layer 102 and an ambient 108 is in the form of a sinusoidal phase grating having line spacing also of d and a peak-to-peak amplitude, also of 2A. In FIG. 1, ambient 108 exhibits an index-of-refraction $n_3$. Further, in FIG. 1, a phase grating forming boundary 106 is spatially in phase with the phase grating forming boundary 104. Referring to FIG. 2, a beam of incident light 200, traveling through substrate 100 and inclined at an angle $\alpha$ with respect to the normal to boundary 104 of semi-thick layer 102, is diffracted by the sinusoidal phase grating at boundary 104 into zero and higher diffraction orders as it enters layer 102. FIG. 2 shows only the zero (0) and first diffraction orders ($+1$ and $-1$) of light within the layer 102 (although diffraction orders higher than the first may also be present). The −1 diffraction order travels the distance $t_{-1}$ in traversing the distance in layer 104 between boundary 104 and boundary 106. Similarly, the zero diffraction order travels the distance $t_0$ and the +1 diffraction order travels the distance $t_1$ in traversing the distance in layer 102 between boundary 104 and boundary 106. The sinusoidal phase grating forming boundary 106 further diffracts the light exiting from layer 102 into ambient 108 through boundary 106. More specifically, since the line spacing d and the phase of the respective sinusoidal phase gratings forming boundaries 104 and 106 are the same as one another, the zero order of the $t_{-1}$ beam and the −2 diffraction order of the $t_1$ beam exit from layer 102 traveling in a direction in ambient 108 which is parallel to that of the −1 order of $t_0$ beam, as indicated by −1 bracket 202. Similarly, as indicated by 0 bracket 204, the +1 diffraction order of $t_{-1}$ and the −1 diffraction order of $t_1$ exit from layer 102 traveling in a direction in ambient 108 which is parallel to the zero order of the $t_0$ beam. Also, as indicated by +1 bracket 206, the $t_2$ diffraction order of $t_{-1}$ and the zero order of $t_1$ exit from layer 102 traveling in a direction in ambient 108 that is parallel to that of the +1 diffraction order of beam $t_0$. Although not shown in FIG. 2, there may be light in other diffraction orders traveling within ambient 108. In accordance with the principles of the present invention, it can be shown, both experimentally and theoretically, that the percentage of incident light 200 exiting from layer 102 into ambient 108 and traveling in any particular direction, such as in the direction of the +1 diffraction order indicated by bracket 206, is a function of the thickness t of layer 102 and the angle α of incident beam 200.

In accordance with scalar wave optics (which is strictly valid only for cases in which the line spacing d is at least equal to four times the wavelength of the incident light), the intensity of the light $I_m$ diffracted into the m order by a "semi-thick" sinusoidal phase grating having a thickness t (which is much larger than the wavelength λ of the incident light) is given by the following equation:

$$I_m = \left| \sum_{k=-\infty}^{\infty} J_{k+m}(x) J_{-k}(y) \exp(in_2 k_o t_k) \right|^2 \quad \text{[Equation 1]}$$

where
$J_k = k^{th}$ order Bessel function
$k_o = 2\pi/\lambda$
$x = k_o A_x(n_1 - n_2)$
$y = k_o A_y(n_2 - n_3)$
$t_k$ = light path of $k^{th}$ order wave within layer
$i = (-1)^{\frac{1}{2}}$
$I_m$ is periodic in t (period = $t_s = 2n_2 d^2/\lambda$ = "self-imaging distance") and for special values of t (e.g., t = $t_s$, $t_s/2$, etc.) also periodic in α.

In more physical terms, the structure shown in FIG. 1 may be considered as two plane parallel phase gratings acting in series. In FIG. 1, both the physical amplitude $A_x$ of the phase grating at boundary 104 and the physical amplitude $A_y$ of the phase grating at boundary 106 have the same value A (although this is not essential). However, because the two gratings have exactly the same spatial frequency ($d^{-1}$) and orientation and are at a well defined separation t, the diffraction process is not simply the one to be expected for two gratings in series. This is true because interference effects become important (similar to example, as in anti-reflection coatings or dielectric multi-layer filters). The amount of light which is diffracted into the different orders depends on the parameters $n_1$, $n_2$, $n_3$, d, t, the wavelength λ and the incident angle α of the light. These sets of parameters are of special interest as they yield special properties. In practice, some of the parameters may be fixed (e.g., $n_1$, $n_2$, $n_3$, and d). Therefore, it is necessary to adjust the remaining parameters (t and α to the optimum value) in order to maximize the percentage of light in a specified diffraction order output (e.g., the +1 order indicated by bracket 206 in FIG. 2). If the respective values of d, $n_1$, $n_2$, $n_3$ and λ, and t are selected such that:

$$n_2 = (n_1 + n_3)/2 \quad \text{[Equation 2]}$$

and $$t = (n_2 d^2)/2\lambda = t_s/4 \quad \text{[Equation 3]}$$

then, according to Equation 1, the relative amount of light intensity (i.e., the optical efficiency) of the +1 diffraction order (indicated by bracket 206) becomes:

[Equation 4]

$$I_{+1} = 2J_1^2 \left[ \frac{k_o A(n_1 - n_3)}{\sqrt{2}} \right] \text{ at } \alpha = \frac{\lambda}{2d}$$

It should be noted that the value of α for the angle of incidence set forth in Equation 4 is one-half the λ/d of the diffraction angle. (Strictly, this is only true for coarse gratings and small diffraction angles where sin α ≈ d).

A corresponding formula is known in the art for the optical efficiency of a first diffraction order, such as the +1 diffraction order of a thin transmissive sinusoidal phase grating. Specifically, the following equation shows this relative intensity of a thin grating as a function of its physical amplitude A, (assuming that layer 102 is absent, so that substrate 100 directly interfaces with ambient 108):

$$I_{+1} = J_1^2[k_o A(n_1 - n_3)] \quad \text{[Equation 5]}$$

FIG. 3 shows a plot of Equation 4 in solid line 300 and a plot of Equation 5 in dashed line 302. As indicated on plot 300, a "semi-thick," relatively coarse, sinusoidal phase grating structure employing the principles of the present invention exhibits a maximum optical efficiency of 68% for a first diffraction order, such as the +1 diffraction order. This is double the 34% maximum efficiency, shown in plot 302, for an equivalent thin, relatively coarse, sinusoidal phase grating structure. As is apparent from comparing Equations 4 and 5 and plots 300 and 302 of FIG. 3, the maximum efficiency of 68% for a relatively coarse "semi-thick" phase grating structure occurs at a value of physical amplitude A (of each of the phase gratings formed by respective boundaries 104 and 106) which is $\sqrt{2}$ times as large as the value of the physical amplitude A (or, more generally, is $\sqrt{2}$ times as large as the average $A_x + A_y$ irrespective of whether $A_x$ is or is not equal to $A_y$) at which the maximum efficiency of 34% of a thin phase grating structure occurs.

The validity of plot 300, which was derived theoretically from Equations 1-14, has been substantiated experimentally. Maximum efficiencies for relatively coarse "semi-thick" experimental sinusoidal phase gratings were, in fact, in the neighborhood of 68%. Furthermore, tolerances are not too critical. Deviations of ±20% from optimized values of $n_2$, t or $\alpha$ still yielded an efficiency over 60%.

For some applications, such as focused image holography, it is desirable that a first order diffraction beam emerge perpendicular to the plane of the gratings. This is achieved in the embodiment shown in FIGS. 4 and 5. This second embodiment is similar to that shown in FIGS. 1 and 2 except for the fact that the two phase gratings in the second embodiment are spatially displaced in phase by an amount equal to d/4 with respect to one another and that the respective values of angle $\alpha$ for the two embodiments are different from one another. The manner in which this phase displacement of d/4 may be accomplished is discussed in detail below. In FIG. 5, the value $\lambda/d$ of the angle $\alpha$ of incident beam 500 is the same as the diffraction angle (rather than one-half the diffraction angle as shown in Equation 4 above). Although other diffraction orders may exist, FIG. 5 shows only zero diffraction order 502, $-1$ diffraction order 504 and $-2$ diffraction order 506. In the case of this second embodiment, it is $-1$ diffraction order 504 which provides an optical efficiency of 68% (in accordance with Equation 2, 3 and 4) when $\alpha = \lambda/d$ and the physical amplitude A has the proper value shown in FIG. 3.

In the embodiment shown in FIGS. 1 and 4, the ambient 108 is usually air. In this case, the value of the index-of-refraction $n_3$ is substantially unity. However, in order to protect the upper phase grating formed in layer 102 from dirt, grease, etc., a second layer of solid transparent material, having an index-of-refraction $n_3$ greater than unity may be inserted between layer 102 and the ambient (which may be air or any other transparent material). This case is shown in the third embodiment of FIG. 6. Referring to FIG. 6, the ambient 110, which may or may not be air, has an index-of-refraction $n_4$. The transparent material 108 (having an index-of-refraction $n_3$) which forms phase grating boundary 106 with layer 102, is inserted between layer 102 and ambient 110. In all other respects the structure of FIG. 6 is similar to that of FIG. 1. The operation of the embodiment of FIG. 6 is similar to that of FIG. 1, since the presence of second layer 108 performs no other function than protecting the phase grating forming boundary 106.

The transmissive phase grating structure embodiment of FIG. 7 is substantially different from those of FIGS. 1, 4 and 6. More specifically, substrate 700 and protective layer 708, in FIG. 7, are composed of materials (preferably the same material) exhibiting the same index-of-refraction $n_1$. "Semi-thick" layer 702, has a thickness t and any desired index-of-refraction $n_2$ so long as it is substantially different from $n_1$ of substrate 700 and protective layer 708. Thus, Equation 3, but not Equation 2, applies to the embodiment of FIG. 7. In order to compensate for the fact that the index-of-refraction of both substrate 700 and protective layer 708 are the same, the phase grating formed at boundary 708 is spatially phase displaced with respect to the phase grating at boundary 704 by one-half cycle (i.e., d/2). With these structural changes, the operation of the embodiment of FIG. 7 is effectively the same as that described above in connection with FIGS. 1 and 2.

The embodiment shown in FIG. 8 is a reflective phase grating structure that is the full functional equivalent of the transmissive phase grating structure shown in FIG. 7. In FIG. 8, the "semi-thick" layer 802, which has a thickness of only one-half t (as determined by Equation 3) is backed by metalized reflective surface 803 forming a mirror. Protective layer 808 corresponds in function to both substrate 700 and protective layer 708 and the single physical phase grating formed by boundary 804 corresponds effectively to both the phase gratings formed by respective boundaries 704 and 706 of the transmissive grating structure of FIG. 7. In operation, incident light from ambient 810 travels successively through protective layer 808, the first effective phase grating (the physical phase grating formed by boundary 804) and then layer 802 to mirror 803. Thereafter, the reflected light from mirror 803 returns to ambient 810 by traveling successively through layer 802, the second phase effective grating (also the physical grating formed by boundary 804) and then protective layer 808.

Two different techniques have been successfully tried for fabricating a "semi-thick" sinusoidal phase grating structure. In accordance with the first of these techniques, a surface relief grating etched in a photoresist substrate ($n_1 = 1.6$) was vacuum vaporated with a "semi-thick" layer of $MgF_2$ ($n_2 = 1.38$). In this case, the ambient was air ($n_3 = 1.0$). It was found that when the surface relief grating was coarse (the line spacing d much greater than the wavelength $\lambda$) and t had a value determined by Equation 3, the measured diffraction efficiencies agreed closely with that predicted by theory (Equations 1, 2, 3 and 4). In accordance with the second of these two techniques, the "semi-thick" layer was in the form of a thin glass plate (t=0.16 mm, $n_2=1.5$) which was thinly coated on both sides with a photoresist having nearly the same index-of-refraction $n=1.6$) and then simultaneously exposed to a laser beam interference pattern to form gratings. In this case, the air on either side of the photoresist-coated plate provided the same value of unity for both $n_1$ and $n_3$ and the relative spatial phase between the two gratings was determined by the angle between glass plate and the laser beam interference pattern. For any resulting spatial phase, there is a corresponding angle of incidence which yields optimum optical efficiency. Despite these differences from those determined by Equations 2 and 4, it was found that, by adjustment of the value of the angle $\alpha$ of the incident light, an optical efficiency of 60% could be obtained from such a coarse-grating, photoresist-coated thin glass plate. Furthermore, it was found that fine-line (line spacing d approximately equal to the wavelength of the incident light) grating, photoresist-coated thin glass plate embodiments of the present invention provided significantly higher maximum optical efficiencies (up to 80%) than could be predicted by scalar theory (Equation 1). It is believed that these experimentally-verified high efficiencies of fine-line "semi-thick" grating structures result from the combined effects of the teachings of both the present invention and of my aforesaid U.S. Pat. No. 3,961,836.

A third technique, which has not been tried, seems to be the most attractive in high volume production. In accordance with this third technique, a thin uniform layer of one plastic (typically about 1 $\mu$m thick) is deposited onto another flat plastic substrate (which has a different refractive index from that of the uniform layer). Then, a relief pattern is embossed (by compression molding as is known in the art) from a relief master on a rotary press. The embossed relief pattern is simultaneously embossed at both the interface of the two plastics and at the face of the uniform plastic layer, which latter is directly in contact with the relief master.

In the case of the embodiment shown in FIG. 4, there are several ways of obtaining the offset of d/4 between the spatial phase of the two gratings. One way of accomplishing this, employing the first technique discussed above, is to evaporate layer 102 at a certain angular direction 400 with respect to the normal 402 to the plane of layer 100, as shown in FIG. 4. Specifically, the value of this certain angle is $\lambda/2\alpha n_2$. The desired offset d/4 between the two gratings in FIG. 4, utilizing the second technique, is obtained by exposing one of the two interfering laser beams at a normal angle and the other of the two interfering laser beams at an angle $\lambda/d$ with respect to the glass plate (which is the set up for making a volume hologram with the desired property). A manner of achieving the d/4 offset, which may work employing the third technique, is to maintain the surface of the uniform plastic layer at a proper oblique angle with respect to the surface of the rotary press.

A high optical efficiency obtainable from "semi-thick" sinusoidal phase grating structures embodying the principles of the present invention is useful in many applications, including focused imaged holography. However, of particular importance is a fine-line reflective "semi-thick" sinusoidal phase grating structure of the type shown in FIG. 8, which has utility in authenticating devices for sheet-material authenticated items of the type disclosed in copending patent application Ser. No. 235,970 by Webster, et al. and Ser. No. 235,971 by Gale, et al., all filed on even date herewith and assigned to the assignee as the present application.

What is claimed is:

1. A sinusoidal phase grating structure responsive to wave energy including a given wavelength $\lambda$ traveling in an entering medium exhibiting a first index-of-refraction $n_1$ that is incident on said structure at a given angle of incidence $\alpha$; said structure comprising:

first means including a first effective sinusoidal phase grating of a given line spacing d and a physical amplitude $A_x$, said first grating being formed by a relief pattern on a first surface of a layer of thickness t of material that is substantially transparent to wave energy of said wavelength $\lambda$ and which exhibits a second index of refraction $n_2$ different from $n_1$, said first surface of said layer being bound by said entering medium, said first means diffracting said incident wave energy at said first surface into at least angularly divergent zero and first diffraction orders traveling in said layer toward a second surface thereof situated opposite the first surface thereof; and second means including a second effective sinusoidal phase grating of said given time spacing d and a physical amplitude $A_y$, said second grating being formed by a relief pattern on said second surface of said layer, said second surface of said layer being bound by an exiting medium that exhibits a third index-of-refraction $n_3$ different from $n_2$, said second means diffracting said respective diffraction orders traveling in said layer and incident on said second surface and thereby giving rise in said exiting medium to interfering diffraction orders that combine to form an output beam corresponding to a first diffraction order, said output beam containing a certain proportion of said incident wave energy having a value which is a function of the respective values of $\lambda$, $\alpha$, d, $n_1$, $n_2$, $n_3$, t and the arithmetic mean of $A_x$ and $A_y$;

wherein $\lambda$, $\alpha$, d, $n_1$, $n_2$, $n_3$, t, $A_x$ and $A_y$ have respective values that provide a value for said certain proportion of said incident wave energy in said output beam which is significantly greater than 34%.

2. The structure defined in claim 1, wherein said structure is a transmissive phase grating structure in which each of said first and second effective gratings is comprised of a separate physical sinusoidal phase grating with said second grating having a certain relative spatial phase with respect to that of said first grating, wherein said thickness t of said layer is within 20% of being equal to the value $n_2 d^2/2\lambda$, and wherein $\lambda$, $\alpha$, d, $n_1$, $n_2$, $n_3$, t, $A_x$ and $A_y$ have respective values that provide a value for said certain proportion of said incident wave energy in said output beam which is at least 60%.

3. The structure defined in claim 2,
   wherein d is a least equal to $4\lambda$, and
   wherein $n_2$ is within 20% of being equal to $(n_1+n_3)/2$.

4. The structure defined in claim 3,
   wherein said first and second gratings are substantially in spatial phase with one another and,
   wherein said value of $\alpha$ is within 20% of being equal to $\lambda/2d$.

5. The structure defined in claim 4,
   wherein said thickness t is substantially equal to $n_2 d^2/2\lambda$,
   wherein $n_2$ is substantially equal to $(n_1+n_3)/2$,
   wherein said value of $\alpha$ is substantially equal to $\lambda/2d$, and
   wherein said arithmetic mean of $A_x$ and $A_y$ has a value at which said value of said certain proportion is substantially 68%.

6. The structure defined in claim 5,
   wherein $A_x$ and $A_y$ have substantially the same value A.

7. The structure defined in claim 3,
   wherein said first and second gratings are offset in spatial phase with one another by substantially d/4, and
   wherein said value of $\alpha$ is within 20% of being equal to $\lambda/d$.

8. The structure defined in claim 7,
   wherein said thickness t is substantially equal to $n_2 d^2/2\lambda$,
   wherein $n_2$ is substantially equal to $(n_1+n_3)/2$,
   wherein said value of $\alpha$ is substantially equal to $\lambda/d$, and
   wherein said arithmetic mean of $A_x$ and $A_y$ has a value at which said value of said certain proportion is substantially 68%.

9. The structure defined in claim 8,
   wherein $A_x$ and $A_y$ have substantially the same value A.

10. The structure defined in claim 2,
    wherein $n_1$ is greater than $n_2$ and $n_2$ is greater than $n_3$.

11. The structure defined in claim 10, wherein $n_3$ is substantially equal to unity.

12. The structure defined in claim 10, wherein $n_3$ is substantially greater than unity.

13. The structure defined in claim 2, wherein $n_1$ is substantially equal to $n_3$.

14. The structure defined in claim 13, where both $n_1$ and $n_3$ are substantially equal to unity.

15. The structure defined in claim 2,
wherein said first and second gratings are offset in spatial phase with one another by substantially $d/2$,
wherein $n_1$ and $n_3$ are substantially equal to one another, and
wherein said value of $\alpha$ is within 20% of being equal to $\lambda/2d$.

16. The structure defined in claim 15,
wherein said thickness t of said layer is substantially equal to the value to $n_2 d^2/2\lambda$,
wherein said value of $\alpha$ is substantially equal to $\lambda/2d$, and
wherein at a given value of said arithmetic mean of $A_x$ and $A_y$ said value of said certain proportion is a maximum and wherein said arithmetic means of $A_x$ and $A_y$ has substantially said given value.

17. The structure defined in claim 16,
wherein $A_x$ and $A_y$ have substantially the same value A.

18. The structure defined in claim 2,
wherein d is at least equal to $\lambda$ and is substantially smaller than $4\lambda$.

19. The structure defined in claim 18,
wherein the respective values of said thickness t of said layer, d, $\alpha$ and the arithmetic mean of $A_x$ and $A_y$ provide a value of said certain proportion that exceeds 68%.

20. The structure defined in claim 18,
wherein the respective values of said thickness t of said layer, d, $\alpha$ and the arithmetic mean of $A_x$ and $A_y$ provide a value of said certain proportion that is at least 80%.

21. The structure defined in claim 1,
wherein said structure is a reflective grating structure in which said layer is backed by a mirror on a first of two opposite surfaces thereof and in which both said first effective grating and second effective grating are comprised of the same single physical grating formed as a relief pattern having an amplitude A on a second of said two opposite surfaces thereof.
wherein said entering and exiting mediums are comprised of the same single medium exhibiting an index-of-refraction n and in contact with said physical grating such that wave energy incident on said single physical grating from said single medium first travels through said layer toward said mirror and is then reflected from said mirror and travels back through said layer and said single physical grating to said single medium
wherein said thickness t of said layer is within 20% of being equal to the value of $n_2 d^2/4\lambda$, and
wherein $\lambda$, $\alpha$, d, $n_1$, $n_2$, t and A have respective values that provide a value of said certain proportion which is at least 60%.

22. The structure defined in claim 21,
wherein d is at least equal to $\lambda$ and is substantially smaller than $4\lambda$, and
wherein the respective values of said thickness t of said layer, d, $\alpha$ and A provide a value of said certain proportion that exceeds 68%.

* * * * *

UNITED STATES PATENT AND TRADEMARK OFFICE
CERTIFICATE OF CORRECTION

PATENT NO. : 4,426,130

DATED : January 17, 1984

INVENTOR(S) : Karl H. Knop

It is certified that error appears in the above-identified patent and that said Letters Patent is hereby corrected as shown below:

Col. 5, line 2, "Equations 1-14," should be
--Equations 1-4,--.

Signed and Sealed this

Twentieth Day of March 1984

[SEAL]

*Attest:*

GERALD J. MOSSINGHOFF

*Attesting Officer*    *Commissioner of Patents and Trademarks*